(12) United States Patent
Carlson

(10) Patent No.: US 10,919,987 B2
(45) Date of Patent: Feb. 16, 2021

(54) SYSTEMS AND METHODS FOR DEWATERING A SLURRY THAT INCLUDES LIGNOCELLULOSIC BIOMASS AND LIQUID

(71) Applicant: POET Research, Inc., Sioux Falls, SD (US)

(72) Inventor: David Charles Carlson, Brandon, SD (US)

(73) Assignee: POET Research, Inc., Sioux Falls, SD (US)

(*) Notice: Subject to any disclaimer, the term of this patent is extended or adjusted under 35 U.S.C. 154(b) by 24 days.

(21) Appl. No.: 16/033,705

(22) Filed: Jul. 12, 2018

(65) Prior Publication Data

US 2019/0016829 A1  Jan. 17, 2019

Related U.S. Application Data

(60) Provisional application No. 62/532,228, filed on Jul. 13, 2017.

(51) Int. Cl.
*C08B 37/00* (2006.01)
*C13K 1/04* (2006.01)
(Continued)

(52) U.S. Cl.
CPC ........ *C08B 37/0003* (2013.01); *C02F 11/121* (2013.01); *C02F 11/125* (2013.01);
(Continued)

(58) Field of Classification Search
CPC ........ C08B 37/0003; C08H 8/00; C13K 1/02; C13K 1/04; C02F 11/125; C02F 11/121; C02F 2103/26
(Continued)

(56) References Cited

U.S. PATENT DOCUMENTS 3,188,942 A * 6/1965 Wandel ................ B01D 29/94
100/72
5,425,876 A   6/1995 Rector
(Continued)

FOREIGN PATENT DOCUMENTS

| CN | 102372327 A | 3/2012 |
|----|-------------|--------|
| EP | 2185734 B1  | 3/2011 |
| WO | 2014026154 A1 | 2/2014 |

OTHER PUBLICATIONS

International Search Report for International Application No. PCT/US2018/041760, dated Feb. 19, 2019, (5 pages).
(Continued)

*Primary Examiner* — Madeline Gonzalez
(74) *Attorney, Agent, or Firm* — Kagan Binder, PLLC

(57) ABSTRACT

The present disclosure relates to a dewatering systems, and related methods, that are adapted to convey lignocellulosic biomass to separate at least a portion of the water from a lignocellulosic biomass slurry and accumulate the dewatered lignocellulosic biomass. The dewatering system also includes a headspace occupied by a gas that is at a pressure that facilitates transferring the accumulated biomas into a pretreatment reactor having a pressurized headspace. Such a dewatering system can prevent undue mixing and backflow of gas (e.g., steam) from the pretreatment reactor.

20 Claims, 4 Drawing Sheets

(51) Int. Cl.
  *C02F 11/12* (2019.01)
  *C02F 11/121* (2019.01)
  *C08H 8/00* (2010.01)
  *C13K 1/02* (2006.01)
  *C02F 11/125* (2019.01)
  *C02F 103/26* (2006.01)

(52) U.S. Cl.
  CPC ............... *C08H 8/00* (2013.01); *C13K 1/02* (2013.01); *C13K 1/04* (2013.01); *C02F 2103/26* (2013.01)

(58) Field of Classification Search
  USPC ....... 210/415, 519, 531, 534, 539, 540, 513, 210/171, 172.1–172.6, 205, 207, 218, 210/221.2, 258, 259, 260, 265, 416.1, 210/512.1
  See application file for complete search history.

(56) References Cited

U.S. PATENT DOCUMENTS

| | | | |
|---|---|---|---|
| 5,753,075 | A | 5/1998 | Stromberg et al. |
| 6,174,411 | B1 | 1/2001 | Laakso et al. |
| 6,899,791 | B2 | 5/2005 | Sabourin |
| 8,181,570 | B2 | 5/2012 | Svedberg |
| 9,963,823 | B2 | 5/2018 | Radigan, II et al. |
| 2013/0017589 | A1 | 1/2013 | Dottori et al. |
| 2013/0129573 | A1* | 5/2013 | Rawls ................. C08H 8/00 422/162 |
| 2016/0289720 | A1 | 10/2016 | Redford et al. |

OTHER PUBLICATIONS

Unpublished Utility U.S. Appl. No. 16/142,321, filed Sep. 26, 2018 (Not Attached).

Sweco STA-Sieve Stationary Screening Devices, Bulletin 425, 2001, (3 pages).

Hydroscreen, Solid Liquid Separation Equipment, Retrieved on Jun. 29, 2018 via http://www.parkson.com/products/hydroscreen, 2017, (3 pages).

Fluid-Quip—Gravity Screens, Retrieved on Jun. 29, 2018 via http://fluidquip.com/gravityscreens.htm, (1 page).

Sweco STA-Sieve Stationary Screeners, Retrieved on Jun. 29, 2018 via http://www.sweco.com/other-STA-Sieves.aspx., 2006-2018. (3 pages).

Energy Efficient Solids Feed System for High Pressure Processes, Craven, Jul. 2014, (286 pages).

Feeding Biomass Into Pressure and Related Safety Engineering, Rautalin et al., 1992, (64 pages).

* cited by examiner

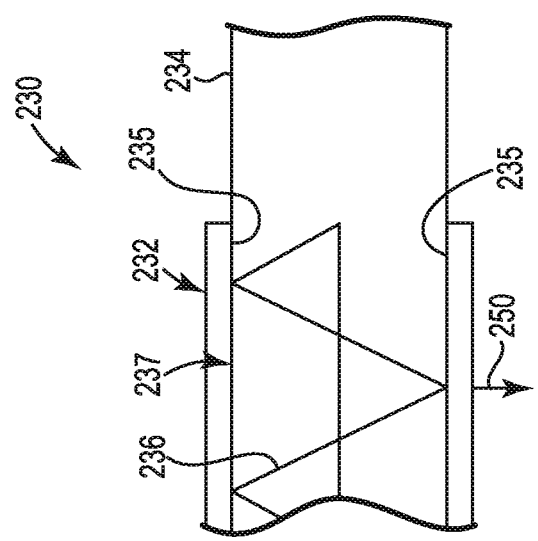

SYSTEMS AND METHODS FOR DEWATERING A SLURRY THAT INCLUDES LIGNOCELLULOSIC BIOMASS AND LIQUID

CROSS-REFERENCE TO RELATED APPLICATION

This application claims priority to provisional patent application entitled "SYSTEMS AND METHODS FOR DEWATERING A SLURRY THAT INCLUDES LIGNO-CELLULOSIC BIOMASS AND LIQUID" filed on Jul. 13, 2017, and having Ser. No. 62/532,228, wherein the entirety of said provisional patent application is incorporated herein by reference.

BACKGROUND

The present disclosure relates to dewatering a slurry that includes lignocellulosic biomass and an aqueous liquid (e.g., water) and introducing the dewatered lignocellulosic biomass into a downstream process of a biorefinery having a gaseous headspace under pressure.

SUMMARY

Embodiments of the present disclosure include a system for dewatering a lignocellulosic biomass slurry, wherein the system includes:
a) a source of a lignocellulosic biomass slurry, wherein the lignocellulosic biomass slurry includes:
  i) lignocellulosic biomass; and
  ii) water;
b) a dewatering system in fluid communication with the source of the lignocellulosic biomass slurry, and adapted to receive the lignocellulosic biomass slurry to separate at least a portion of the water from the lignocellulosic biomass slurry, wherein the dewatering system includes at least a solids transfer device having a housing including an inlet and an outlet, wherein the solids transfer device is adapted to convey and accumulate dewatered lignocellulosic biomass promixal to the outlet of the solids transfer device, wherein a headspace occupied by a gas is present at least at the inlet of the solids transfer device, wherein the headspace is at a first pressure; and
c) at least one vessel in fluid communication with the outlet of the solids transfer device, wherein the vessel is configured to receive the accumulated dewatered lignocellulosic biomass and process the dewatered lignocellulosic biomass, wherein the vessel has a headspace that is occupied by a gas that is at a second pressure, wherein the first pressure has a value that inhibits the gas in the vessel from flowing back through the solids transfer device.

Embodiments of the present disclosure also include a method of dewatering a lignocellulosic biomass slurry, wherein the method includes:
a) providing a lignocellulosic biomass slurry to a dewatering system having an inlet and an outlet, wherein the lignocellulosic biomass slurry includes lignocellulosic biomass and water;
b) separating at least a portion of the water from the lignocellulosic biomass slurry in the dewatering system to form a dewatered lignocellulosic biomass, wherein the dewatering system includes a headspace occupied by a gas at a first pressure;
c) conveying the lignocellulosic biomass through the dewatering system to accumulate the dewatered lignocellulosic biomass proximal to the outlet of the dewatering system; and
d) providing the accumulated dewatered lignocellulosic biomass to at least one vessel in fluid communication with the dewatering system, wherein the vessel has a headspace that is occupied by a gas that is at a second pressure, wherein the first pressure has a value that inhibits the gas in the vessel from flowing into the dewatering system.

BRIEF DESCRIPTION OF THE DRAWINGS

FIG. 2B shows a portion of an embodiment of the solids transfer device in FIG. 2A.

DETAILED DESCRIPTION

Disclosed in embodiments herein are systems and methods for dewatering a lignocellulosic biomass slurry in a biorefinery and transferring the dewatered lignocellulosic biomass into a pressurized environment for further processing of the lignocellulosic biomass. One or more advantages of systems and methods according to the present disclosure are described throughout the application. Illustrative examples are described herein below with respect to FIGS. 1 and 2.

Methods and systems according to an illustrative example of the present disclosure can be used to dewater lignocellulosic biomass obtained from one or more sources of a lignocellulosic biomass slurry. As used herein, a lignocellulosic biomass slurry is a composition that includes at least lignocellulosic biomass and water.

Lignocellulosic biomass includes residual agricultural material from harvesting such as corn stover (e.g., corn cobs, stalks and leaves), fiber from the corn kernel, switchgrass, wood chips or other wood waste, and other plant matter (grown for processing into bioproducts or for other purposes). Lignocellulosic biomass includes hemicellulose, cellulose, and lignin.

The lignocellulosic biomass present in a slurry can be processed from feedstock prior to or while forming a slurry. Lignocellulosic biomass feedstock can be processed by a variety of techniques such as size reduction, washing, steaming, combinations of these, and the like. For example, a biomass lignocellulosic feedstock can be prepared by grinding the lignocellulosic biomass feedstock in one or more grinders into ground solids to reduce the size of the feedstock and increase its surface area for subsequent processing such as hydrolysis.

Lignocellulosic biomass can be combined with one or more sources of liquids that include water for forming a slurry. Nonlimiting examples of water sources include recycled process water from one or more points in a biorefinery, fresh tap water, combinations of these, and the like. Recycled process water can be treated or not treated prior to being combined with lignocellulosic biomass.

In some embodiments, amounts of lignocellulosic biomass and liquid (e.g., water) can be combined so that a lignocellulosic biomass slurry has a total solids content of 1 to 10 percent, from 2 to 9 percent, or even 3 to 8 percent. As used herein, "total solids content" means the total content of dissolved and suspended solids based on the total weight of the lignocellulosic biomass slurry.

An example of forming a lignocellulosic biomass slurry is described below in connection with FIGS. 2A and 2B.

Figure 1:
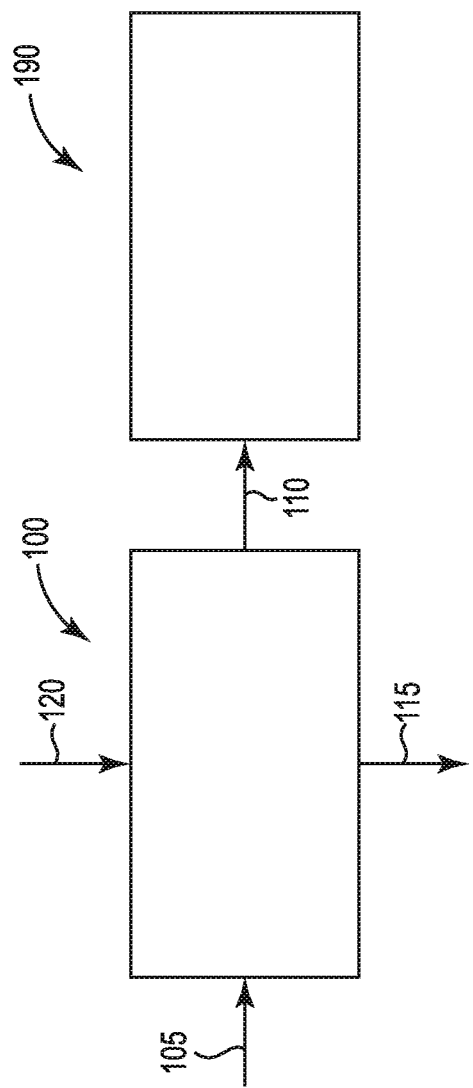
FIG. 1 shows a schematic process flow diagram of an embodiment of the present disclosure.

In the illustrative example of FIG. 1, a source of a lignocellulosic biomass slurry 105 is provided to (e.g., pumped to) a dewatering system 100 that is adapted to receive the lignocellulosic biomass slurry. For example, the source of a lignocellulosic biomass slurry 105 can be provided to system 100 via one or more pumps and associated piping and valves. A dewatering system 100 according to the present disclosure includes at least a solids transfer device having an inlet and an outlet and that is adapted to convey and compress the lignocellulosic biomass to separate at least a portion of the water from the lignocellulosic biomass slurry 105 and form accumulated biomass 110 comprising the dewatered lignocellulosic biomass. As shown in FIG. 1, the liquid (e.g., water) 115 that is removed from the lignocellulosic biomass slurry 105 can be discharged from the dewatering system 100 via stream 115. In some embodiments, the liquid stream 115 can be recycled to one or more points upstream and/or downstream in a biorefinery.

A biorefinery can include many unit operations that are configured to treat lignocellulosic biomass for a variety of purposes, especially after lignocellulosic biomass has been dewatered from a slurry. Many such unit operations include a headspace occupied by a gas (e.g., air and steam) that is at an elevated pressure relative to upstream processes and/or the ambient environment. As shown in FIG. 1, downstream of the dewatering system 100 is a system 190 that includes at least one vessel in fluid communication with the outlet of the solids transfer device in the dewatering system 100. The vessel is configured to receive the accumulated dewatered biomass 110 and process the dewatered lignocellulosic biomass. The vessel has a headspace that is occupied by a gas that is at a pressure. Because the pressure in the vessel of system 190 can be elevated relative to upstream processes and/or the ambient environment, there is a chance that the gas from system 190 can flow backwards toward one or more upstream processes. Such backward flow can be undesirable for several reasons. For example, such backward flow can be considered a "leak" and the pressurized gas may have to be replenished in system 190, which can be inefficient. If the gas includes steam (e.g., for heating, treating, and the like), then heat is also "leaked" out, which can be inefficient. Also, if steam were to leak back from system 190 into dewatering system 100, the liquid 115 may be heated to the point that it vaporizes. If the liquid 115 is being reused/recycled, it may have to be condensed before being reused/recycled, which can also be inefficient.

In some embodiments, systems and methods according to the present disclosure include the combination of a gas in the dewatering system 100 at a pressure and accumulated lignocellusoic biomass 110 to effectively prevent backflow of gas (e.g., steam) from system 190. Dewatering system 100 can be configured so that a gas is present in a headspace of dewatering system 100 at a pressure that, in combination with the accumulated lignocellusoic biomass 110, prevents backflow of gas from system 190 to an undue degree. The pressure of the gas in the headspace of dewatering system 100 is substantially the same as or greater than the gas pressure in the headspace in system 190 to prevent backflow from system 190. Notwithstanding, the accumulated lignocellulosic biomass can help prevent undue mixing of gas from system 190 headspace with gas in system 100 headspace at the interface of systems 100 and 190. The accumulated lignocellusoic biomass 110 functions as a physical baffle or mat to help segregate the headspace in system 190 from the headspace in dewatering system 100. It can be desirable to segregate the headspace in system 190 from the headspace in system 100 to prevent undue mixing at the interface of systems 100 and 190. For example, if system 190 includes steam, it can be desirable to prevent mixing at the interface of systems 100 and 190 that may occur and introduce an undue amount of steam into system 100. It is noted that the that the accumulated lignocellusoic biomass is not required to be compressed to a degree that it can form a seal to seal in the gas in system 190 from flowing backwards toward dewatering system 100. The pressure of the gas in the headspace of dewatering system 100 is substantially the same or greater than in the headspace in system 190 to help prevent backflow. The accumulated biomass helps to prevent undue mixing at the interface. This can be advantageous because some lignocellulosic biomass can have variable particle size and/or low bulk density making it difficult to compress it enough such that it can form a seal while at the same time having a desired throughput on a continuous basis. It is the combination of the accumulated lignocellulosic biomass 110 and gas pressure in the headspace of dewatering system 100 that prevents undue backflow and mixing of gas from system 190. Advantageously, such a configuration can operate at desirable throughputs on a continuous basis, which is surprising for some lignocellulosic biomass that is challenging to handle and process (e.g., corn stover and the like).

In some embodiments, dewatering system 100 includes a headspace that is occupied by a gas that is in fluid communication with at least the inlet of the solids transfer device. The gas pressure in the headspace of the dewatering system 100 (a first pressure) can be selected so that, in combination with the accumulated lignocellusoic biomass 110, it inhibits the gas at a second pressure in the vessel of system 190 from flowing back through the solids transfer device to an undue degree. In some embodiments, the first and second pressures can be substantially the same. For example, the difference between the first pressure and the second pressure can be 5 psi or less, 1 psi or less, or even 0.5 psi or less. In some embodiments, the first pressure can be maintained at a pressure that is greater than the second pressure. For example, the first pressure can be maintained at a pressure of from 0.5 to 30 psi greater than the second pressure, from 0.5 to 20 psi greater than the second pressure, from 0.5 to 10 psi greater than the second pressure, or even from 0.5 to 5 psi greater than the second pressure.

The gas present in the headspace of dewatering system 100 can be provided from a variety of sources. For example, at least a portion of the gas present at the first pressure in the headspace at the inlet of the solids transfer device in dewatering system 100 can be supplied from gas that is entrained in the lignocellulosic biomass slurry 105. Instead of or in addition to any entrained gas, a dedicated source of compressed gas 120 can be supplied to the headspace of dewatering system 100. Examples of gas 120 include air, inert gas (e.g., nitrogen), carbon dioxide, combinations of these, and the like. In some embodiments, the pressure in the headspace of the dewatering system 100 and the gas in the headspace of system 190 are greater than atmospheric pressure. For example, such pressures can be between 20 and 200 psig.

Figure 2A:
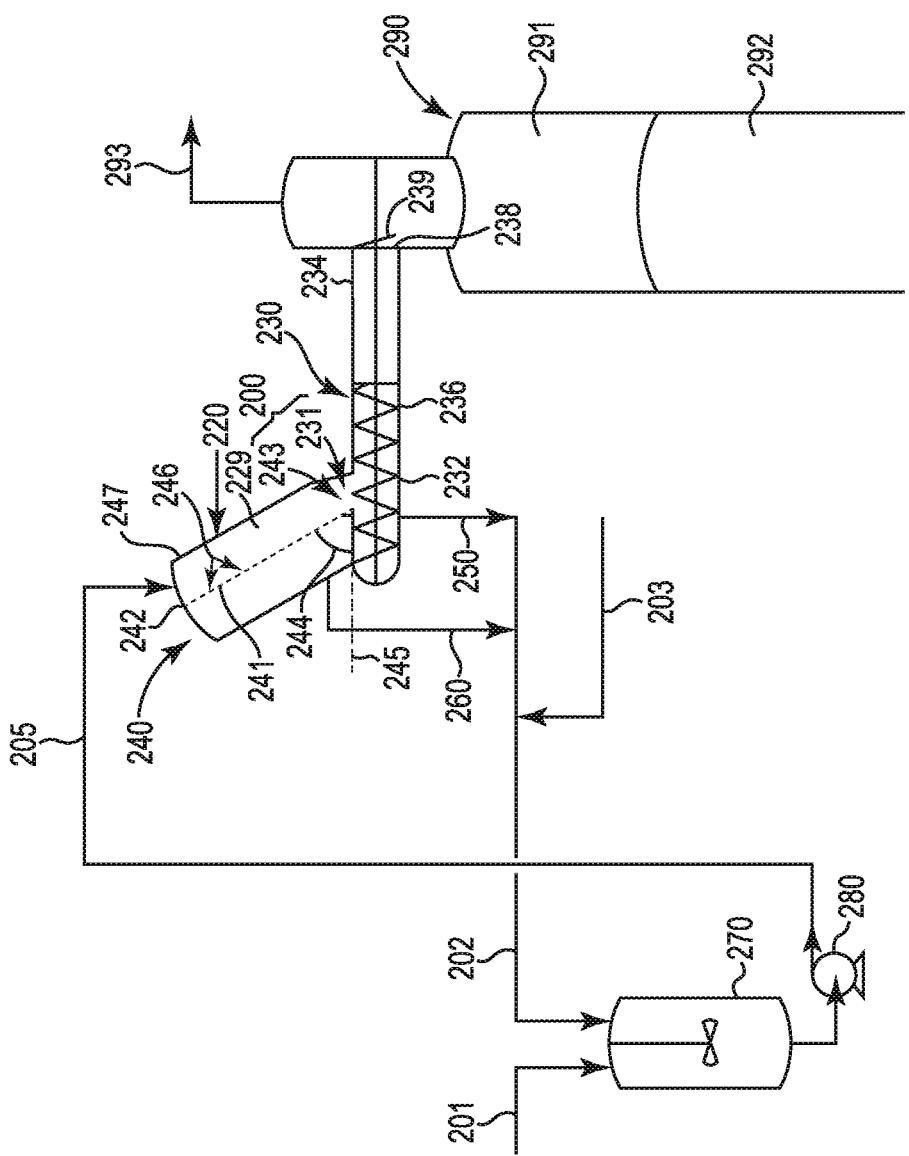
FIG. 2A shows a schematic process flow diagram of another embodiment of the present disclosure.

FIGS. 2A and 2B depict an illustrative example of the present disclosure. As described below, the system in FIG. 2A can advantageously dewater a slurry of ground lignocellulosic biomass on a continuous basis and desired throughput, e.g., in the context of a biorefinery where the dewatered lignocellulosic biomass is subsequently processed, e.g., hydrolyzed.

In a biorefinery, lignocellulosic biomass can be formed into a slurry using one or more tanks (with or without agitation such as mixing). A lignocellulosic biomass slurry can be prepared for one or more reasons such as making the lignocellulosic biomass transportable to one or more unit operations in a biorefinery, and to facilitate distributing any treatment compositions (e.g., acid compositions, base compositions, enzyme compositions, combinations of these, and the like) throughout the lignocellulosic biomass. As shown in FIG. 2A, ground lignocellulosic biomass feedstock 201 is supplied to a slurry system that includes one or more slurry tanks 270. In some embodiments, the ground lignocellulosic biomass 201 includes ground corn stover having a particle size such that at least 80 percent of the ground corn stover passes through a screen having six inch openings, or even a screen having one inch openings, and less than 20 percent of the ground corn stover passes through a screen having 0.125 inch openings.

The ground lignocellulosic biomass feedstock 201 is combined with an aqueous liquid 202 at a desirable ratio. For example, the ground lignocellulosic biomass feedstock 201 can be combined with an aqueous liquid 202 in a ratio so as to form a slurry stream 205 having a desirable total solids content (discussed above) and that is pumpable, e.g., via pump 280. A lignocellulosic biomass slurry stream can be pumpable so that it can be transferred to one or more downstream processes via plumbing that includes, e.g., one or more pipes, one or more valves, and the like. A variety of pumps can be used to pump a lignocellulosic biomass slurry according to the present disclosure. Nonlimiting examples of such pumps include centrifugal pumps such as a screw centrifugal pump commercially available from Hayward Gordon under the tradename XCS screw centrifugal pump or from Vaughan under the tradename Triton® screw centrifugal pump.

As shown in FIG. 2A, aqueous liquid 202 is obtained from at least streams 203, 250 and 260. Stream 203 can be fresh make-up water, recycled process water, or combinations of these. As shown, streams 250 and 260 are recycled from dewatering system 200, which is discussed below.

A slurry according to the present disclosure can be formed under a variety of temperature and pressure conditions. In some embodiments, a slurry can be formed in slurry tank 270 at room temperature and atmospheric pressure.

As shown in FIG. 2A, after forming a lignocellulosic biomass slurry, the slurry stream 205 can be pumped to a downstream process such as pretreatment reactor 290, which can have a gaseous headspace 291 at an elevated pressure, e.g., greater than atmosphere pressure. Before being introduced into pretreatment reactor 290, it may be desirable to dewater the lignocellulosic biomass present in the lignocellulosic biomass slurry stream 205.

Methods and systems according to the example of FIG. 2A include a dewatering system 200 for dewatering the lignocellulosic biomass slurry from stream 205 so that at least some liquid can be removed and the dewatered lignocellulosic biomass can be introduced into a system such as pretreatment reactor 290 without undue mixing and backflow of gas (e.g., steam) from pretreatment reactor 290 into dewatering system 200.

As shown in FIG. 2A, dewatering system 200 includes an enclosed screen device 240 directly coupled to a solids transfer device 230.

The lignocellulosic biomass slurry 205 is delivered to an inlet of screen device 240, where the slurry can undergo an initial dewatering.

As shown in FIG. 2A, enclosed screen device 240 includes a screen 241 positioned in a housing 247 that can be pressurized.

The enclosed screen device 240 is adapted to receive the lignocellulosic biomass slurry stream 205 at a first end 242 of the screen 241 so that the slurry flows down (at least in part due to gravity) and across the screen 241 to separate at least a portion of the water from the lignocellulosic biomass slurry stream 205 and form a first dewatered lignocellulosic biomass that may include residual water from the lignocellulosic biomass slurry stream 205, and lignocellulosic biomass.

In some embodiments, at least 10%, at least 20%, at least 30%, at least 50%, at least 60%, at least 70%, at least 80%, at least 90%, or even at least 95% of the water present in the slurry stream 205 that enters enclosed screen device 240 will pass through the screen 241. In some embodiments, the size of the screen openings can be selected to be small enough to permit substantially all of lignocellulosic biomass to not pass through the openings. In some embodiments, at least 50%, at least 60%, at least 70%, at least 80%, at least 90%, at least 95%, at least 99%, or even at least 99.9% of the lignocellulosic biomass will not pass through the screen 241 as it passes down and across the screen 241.

The screen 241 has a plurality of openings 246. The plurality of openings 246 permit liquid to pass through the screen 241 to separate at least a portion of the water from the lignocellulosic biomass slurry stream 205. The size of the screen openings 246 for screen 241 can be selected to achieve desirable dewatering of lignocellulosic biomass in the slurry 205 while at the same time achieving desirable throughput on a continuous basis. A screen 241 can have openings 246 that are all the same size or a plurality of different sizes. In some embodiments, the screen 241 may have one or more opening sizes of about 0.5 inches or less, about 0.125 inches or less, or even about 0.0625 inches or less. In some embodiments, the screen 241 may include openings 246 having a size in the range from 0.03125 inches to 0.125 inches.

As shown, the screen 241 also has a second end 243 in addition to the first end 242, and the screen 241 is positioned (angled) so that first end 242 is above the second end 243 relative to dashed horizontal line 245 and so that the screen 241 is at an angle 244 greater than zero relative to horizontal line 245. In some embodiments, the screen is positioned (angled) so that the screen 241 is at an angle 244 greater than 20 degrees, 30 degrees, 40 degrees, 50 degrees, 60 degrees, 70 degrees, 80 degrees, or even 90 degrees relative to horizontal line 245.

As shown in FIG. 2A, screen 241 is straight from the first end 242 to second end 243.

Alternatively, the screen in the enclosed screen device could be curved and is discussed below in connection with FIG. 3.

A wide variety of widths and lengths can be selected for screen 241 depending on a variety of factors such as, e.g., screen angle, desired throughput (gallons per minute of slurry), and the like. In some embodiments the length of screen 241 from first end 242 to second end 243 can be from 16 inches to 15 feet, from 30 inches to 10 feet, or even from 40 inches to 9 feet. In some embodiments the width of screen 241 (perpendicular to length) can be from 10 inches to 10 feet, or even from 10 inches to 50 inches.

It has been found that by introducing the slurry stream 205 at the first end 242 (top end) of an inclined screen 241 and letting the slurry flown down and across the screen 241, at least a portion of the liquid (e.g., water) can be separated from the lignocellulosic biomass without undue plugging of the screen 241. This dewatering technique can be robust to variations in solids loading, biomass size, and/or biomass shape (e.g., due to grinding, different forms of lignocellulosic biomass (e.g., corn husks as compared to corn stalks, as compared to corn cobs), and the like). In some embodiments, such dewatering can be performed continuously (e.g., days, weeks, etc.) without undue disruptions. While not be bound by theory, it is believed that by introducing the slurry 205 at the top of an inclined screen 241 permits a relatively high volume and/or velocity of the liquid near the top end 242 to help keep the screen 241 from clogging with lignocellulosic biomass to an undue degree, especially flat biomass structures such as leaves and husks that are present in corn stover. Also, as the lignocellulosic biomass is dewatered as it passes down and across the screen 241, it can contact the screen 241 (e.g., due at least in part to gravity) and have a "scrubbing" effect that likewise helps keep the screen 241 from clogging with lignocellulosic biomass to an undue degree, especially flat biomass structures such as leaves and husks.

Exemplary angled screens 241 are commercially available as, e.g., "gravity screens." One example of a commercially available gravity screen can be obtained from SWECO under the tradename STA-SIEVE stationary screening device having model number SV10S BB. Another example of a commercially available gravity screen can be obtained from Parkson Corporation under the tradename Hydroscreen® solid, liquid separation equipment. Another example of a commercially available gravity screen can be obtained from Fluid-Quip, Inc. To facilitate transferring the dewatered lignocellulosic biomass from enclosed screen device 240 to vessel 290 via solids transfer device 230, the enclosed screen device 240 has a headspace 229 between the top of screen 241 and the housing 247 that can have a gas present at a pressure that, in combination with a accumulated dewatered lignocellulosic biomass exiting the solids transfer device 230, prevents mixing and backflow of gas from vessel 290 through solids transfer device 230 to an undue degree. As shown in FIG. 2A, the headspace 229 is in fluid communication with at least at the inlet 231 of the solids transfer device 230 (e.g., screw conveyor or feeder). The gas pressure (a first pressure) in the headspace 229 can be selected so that, in combination with the accumulated dewatered lignocellulosic biomass from device 230, the gas in headspace 229 inhibits a gas (e.g., steam) at a second pressure in the headspace 291 of vessel 290 from flowing back through the solids transfer device 230 to an undue degree or mixing with any liquid or gas in system 200 to an undue degree. In some embodiments, the first and second pressures can be substantially the same. For example, the difference between the first pressure and the second pressure can be 1 psi or less, or even 0.5 psi or less. In some embodiments, the first pressure can be maintained at a pressure that is greater than the second pressure. For example, the first pressure can be maintained at a pressure of 5 psi or greater than the second pressure, or even 10 psi or greater.

The gas present in the headspace 229 can be provided from a variety of sources. For example, at least a portion of the gas present at the first pressure in the headspace 229 at the inlet 231 of the solids transfer device 230 can be supplied from gas that is entrained in the lignocellulosic biomass slurry stream 205. For example, while not being bound by theory, it is believed that mixing at high speeds in slurry thank 270 can create turbulence that causes gas (e.g., air) to be entrained in lignocellulosic biomass slurry. This entrained gas may be carried to the bottom of slurry tank 270 where it can enter pump 280 and be compressed and transported through one or more pipes in slurry stream 205. When the slurry stream enters the enclosed screen device 240, the gas can expand and escape the slurry to the headspace 229 and create a pressurized headspace 229 near the inlet 231 of solids transfer device 230. Also, the slurry stream 205 can form a physical seal between the headspace 229 and the slurry tank 270 so that the headspace 229 is at an elevated pressure relative to a headspace in the slurry tank, which may be at atmospheric pressure. In addition, slurry stream 205 plumbing can include one or more valves to create a seal between headspace 229 and slurry tank 270.

Instead of or in addition to any entrained gas, a dedicated source of compressed gas 220 can be supplied to the headspace 229. Examples of gas 220 include air, inert gas (e.g., nitrogen), carbon dioxide, combinations of these, and the like. In some embodiments, the pressure in the headspace 229 and the gas in the headspace 291 of vessel 290 are greater than atmospheric pressure. For example, such pressures can be between 20 and 200 psig.

As mentioned above, the dewatering system 200 also includes a solids transfer device 230 for transferring the dewatered, lignocellulosic biomass (first dewatered, lignocellulosic biomass) from enclosed screen device 240 into vessel 290.

As shown in FIG. 2A, solids transfer device 230 has an inlet 231 and an outlet 238, and is adapted to convey the lignocellulosic biomass in the first dewatered, lignocellulosic biomass to separate at least a portion of the residual water 250 from the first dewatered, lignocellulosic biomass and accumulate second, dewatered lignocellulosic biomass proximal to outlet 238 so that it can be fed into vessel 290. In some embodiments, the solids transfer device 230 removes 50% or more of the residual water present in the first, dewatered, lignocellulosic biomass. In some embodiments, the solids transfer device 230 can remove 30% or less, 20% or less, or even 10% or less of the water present in the first, dewatered, lignocellulosic biomass.

A variety of solids transfer devices can be used to convey and compress lignocellulosic biomass according to the present disclosure. As shown in FIG. 2A, solids transfer device 230 includes a tubular trough or barrel member 232 having the inlet 231 at one end and the outlet 238 at the opposite end. The inlet 231 is adapted to receive the first dewatered lignocellulosic biomass at the first pressure in the headspace 229. As shown in FIG. 2B, the barrel member 232 can include a screw section 237 having a rotatable screw 236 positioned in the screw section 237 for conveying the lignocellulosic material. The screw can be driven by a motor (not shown). Because the solids transfer device can be configured to convey and accumulate the lignocellosic biomass without compressing the biomass to a high degree, a motor with relatively low horsepower can be used for desirable througputs. For example, a motor having a horsepower of about 200 or less (e.g., 0.26 HP/(ton/day)) could be used to convey lignocellulosic biomass through solids transfer device 230 at a throughput of up to 700 or even 800 tons per day. Because compressing the lignocellulosic biomass to form a gas seal between headspace 291 and 229 is not required, solids transfer device 230 can experience less abrasive wear.

As shown in FIG. 2B, the screw section 237 can also include a screen 235 mounted between the barrel member 232 and screw 236 to help remove residual water from the first dewatered lignocellulosic biomass and form recycle stream 250.

As shown in FIG. 2B, the barrel member 232 can also include an accumulation section 234 proximal to the outlet 238 of barrel member 232.

A solids transfer device such as solids transfer device 230 may include one or more mechanical features that promote accumulating lignocellulosic biomass proximal to outlet 238 and between the headspace 229 and the headspace 291. Nonlimiting examples of such mechanical features include a flapper gate 239 on the discharge outlet 238; or a back-pressure cone (not shown) on the discharge outlet 238 of the solids transfer device 230.

As mentioned above, biorefineries can include one or more unit operations such as vessel 290 that are configured to treat lignocellulosic biomass for a variety of purposes, especially after lignocellulosic biomass has been dewatered from a slurry. Such unit operations can include a headspace 291 and mass of lignocellulosic biomass 292, wherein the headspace 291 is occupied by a gas (e.g., air and/or steam) that is at an elevated pressure relative to upstream processes such as slurry tank 270. As shown in FIG. 2A, downstream of the slurry tank 270 is vessel 290 in fluid communication with the outlet 238 of the solids transfer device 230 in the dewatering system 200. As shown, the vessel 290 is configured to continuously receive the accumulated lignocellulosic biomass from solids transfer device 230 and process the dewatered lignocellulosic biomass. Because the pressure in headspace 291 can be elevated relative to slurry tank 270 and/or the ambient environment, there is a chance that the gas from vessel 290 can flow backwards toward one or more upstream processes. Such backward flow can be undesirable for several reasons. For example, such backward flow can be considered a "leak" and the pressurized gas may have to be replenished in vessel 290, which can be inefficient. If the gas includes steam (e.g., for heating and the like), then heat is also "leaked" out, which can be inefficient. Also, if steam were to leak back from vessel 290 into dewatering system 200, the liquid in streams 202, 250, and 260 may be heated to the point that it vaporizes. Because the liquid in streams 202, 250, and 260 is being reused/recycled to slurry tank 275, it would have to be condensed before being reused/recycled, which can also be inefficient.

Dewatering system 200 includes the combination of a gas in headspace 229 and accumulated dewatered lignocellulosic biomass in the solids transfer device 230 to effectively prevent mixing and backflow of gas (e.g., steam) from vessel 290. Dewatering system 200 can be configured so that a gas is present in headspace 229 is at a pressure that, in combination with the accumulated dewatered lignocellulosic biomass from feeder 230, prevents mixing and backflow of gas from vessel 290 through solids transfer device 230 to an undue degree. The accumulated dewatered lignocellulosic biomass in feeder 230 can function as a physical baffle or mat to segregate the headspace 229 from the headspace 291. It can be desirable to segregate the headspace 291 from the headspace 229 to prevent undue mixing at the interface of system 200 and reactor 290. For example, if reactor 290 includes steam, it can be desirable to prevent mixing at the interface of system 200 and reactor 290 that may occur and introduce an undue amount of steam into system 200. It is noted that the accumulated dewatered lignocellulosic biomass is not required to be compressed to a degree that it can form a seal to seal in the gas in vessel 290 from flowing backwards into system 200. The gas in the headspace 229 of dewatering system 200 is the substantially the same or greater than the headspace 291 in reactor 290 to help prevent backflow. The accumulated biomass helps to prevent undue mixing at the interface. It is the combination of the accumulated biomass from feeder 230 and the gas pressure in the headspace 229 that prevents undue mixing and backflow of gas from vessel 290. Advantageously, such a configuration can operate at desirable throughputs on a continuous basis, which is surprising for some lignocellulosic biomass that is challenging to handle and process (e.g., ground corn stover and the like). As another advantage, relatively less dense and/or variable size lignocellulosic biomass that may be difficult to compress to form a "sealing" plug to seal off headspace 229 can still be dewatered and transferred into a pressurized environment such as vessel 290 by using pressurized headspace 229 in combination with a "less dense" accumulated biomass from feeder 229 according to the present disclosure. As yet another advantage, because the lignocellulosic biomass does not need to be compressed to a degree to form a seal from headspace 291, the solids transfer device 230 may operate at lower power consumption and lower equipment wear.

A variety of reactors 290 can be used to process lignocellulosic biomass 292. In a biorefinery, an exemplary reactor is a pretreatment reactor. As shown, reactor 290 includes a pressurized headspace 291 above a pile of lignocellulosic biomass 292 with a vent 293 to remove gas from headspace 291 as desired. The contents (lignocellulosic biomass 292 and aqueous liquid (not shown)) of a pretreatment reactor can be exposed to a temperature and pH for a time period to hydrolyze one or more polysaccharides present in the lignocellulosic biomass into one or more monosaccharides (sugars) that can be converted into one or more biochemicals using one or more microorganisms. Exemplary hydrolysis conditions include exposing the lignocellulosic biomass to an aqueous liquid at a temperature in the range from 245° F. to 350° F. and a pH in the range from 0.5 to 3.0 for a time period in the range from 0.5 to 5 hours. Sugars can be made available by processing the lignocellulosic biomass using one or more techniques such as acid hydrolysis, enzymatic hydrolysis, and the like.

Figure 3:
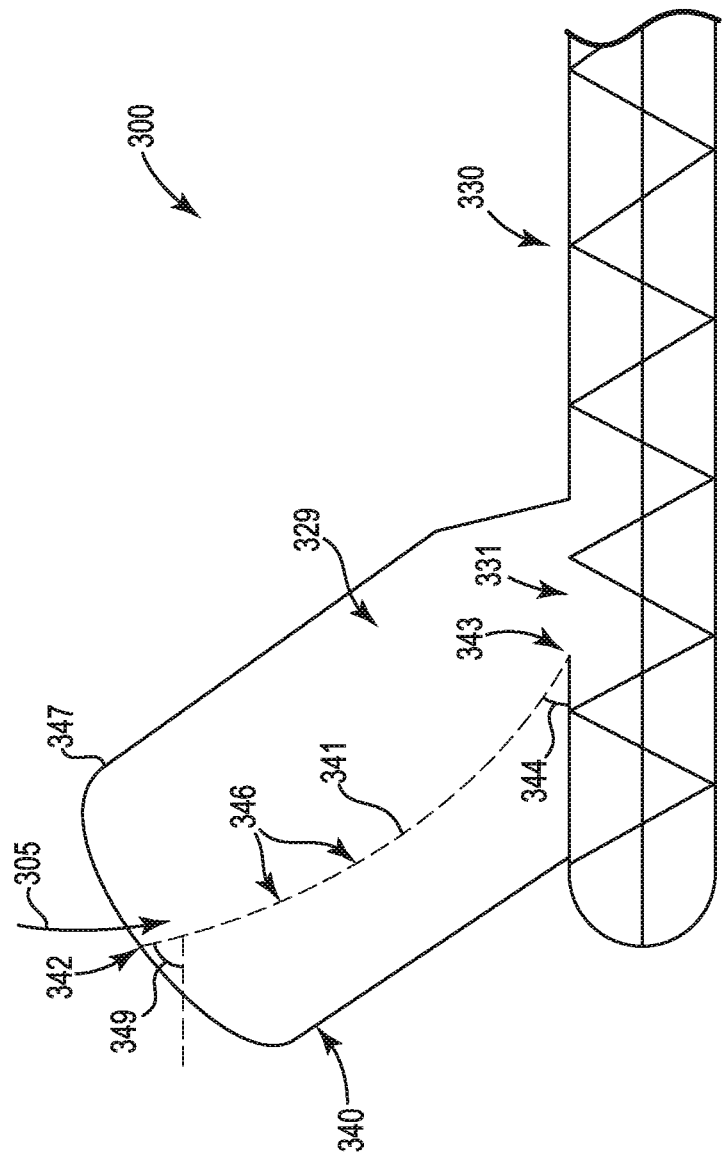
FIG. 3 shows a schematic process flow diagram of another embodiment of the present disclosure.

FIG. 3 illustrates another embodiment of the present disclosure. The embodiment shown in FIG. 3 is the same the embodiment discussed above with respect to FIG. 2A, except that the screen in the enclosed screen device in FIG. 3 is curved instead of straight. Dewatering system 300 includes an enclosed screen device 340 directly coupled to a solids transfer device 330. The lignocellulosic biomass slurry 305 is delivered to an inlet of screen device 340, where the slurry can undergo and initial dewatering.

As shown in FIG. 3, enclosed screen device 340 includes a screen 341 positioned in a housing 347 that can be pressurized. The enclosed screen device 340 is adapted to receive the lignocellulosic biomass slurry stream 305 at a first end 342 of the screen 341 so that the slurry flows down (at least in part due to gravity) and across the screen 341 to separate at least a portion of the water from the lignocellulosic biomass slurry stream 305 and form a first dewatered lignocellulosic biomass that may include residual water from the lignocellulosic biomass slurry stream 305, and lignocellulosic biomass.

The screen 341 has a plurality of openings 346. The plurality of openings 346 permit liquid to pass through the screen 341 to separate at least a portion of the water from the lignocellulosic biomass slurry stream 305. As shown, screen 341 is a concave, curved surface from the first end 342 to second end 343, with a radius of curvature from 20 to 150 inches, or even from 40 to 120 inches. For screens 341 having a concave, curved surface, such screens can be positioned relative to horizontal to achieve a desired angle 349 at the first end 342 (inlet) and a desired angle 344 at a second end 243 (outlet). In some embodiments the screen 341 can have an inlet angle 349 in the range from 55 to 99 degrees, or even from 85 to 95 degrees, and an outlet angle 344 in the range from 25 to 60 degrees, or even from 25 to 35 degrees. While not be bound by theory, it is believed that by having a relatively larger angle 349 at the inlet 342 permits a relatively high velocity of the liquid near the top end 342 to help keep the screen 341 from clogging with lignocellulosic biomass to an undue degree, especially flat biomass structures such as leaves and husks that are present in corn stover.

As the lignocellulosic biomass leaves the second end 343 of screen 341 it enters the opening 331 of solids transfer device 330. As can be seen, the opening 331 of solids transfer device is exposed to the headspace 329 of enclosed screen device 340 so that the gas pressure at the inlet 331 can be controlled by controlling the pressure in headspace 329 as discussed above with respect to FIG. 2A.

What is claimed is:

1. A system for dewatering a lignocellulosic biomass slurry, wherein the system comprises:
   a) a source of a lignocellulosic biomass slurry, wherein the lignocellulosic biomass slurry comprises:
      i) lignocellulosic biomass; and
      ii) water;
   b) a dewatering system in fluid communication with the source of the lignocellulosic biomass slurry, and adapted to receive the lignocellulosic biomass slurry to separate at least a portion of the water from the lignocellulosic biomass slurry, wherein the dewatering system comprises at least a solids transfer device having a housing including an inlet and an outlet, wherein the solids transfer device is adapted to convey and accumulate dewatered lignocellulosic biomass proximal to the outlet of the solids transfer device, wherein the solids transfer device is configured to have a first headspace occupied by a gas is present at least at the inlet of the solids transfer device when conveying and accumulating dewatered lignocellulosic biomass, wherein the first headspace is at a first pressure; and
   c) at least one vessel in fluid communication with the outlet of the solids transfer device, wherein the vessel is configured to receive the accumulated dewatered lignocellulosic biomass and process the dewatered lignocellulosic biomass, wherein the vessel has a second headspace that is occupied by a gas that is at a second pressure, wherein the second pressure is greater than atmospheric pressure when receiving the accumulated dewatered lignocellulosic biomass, and wherein the first pressure has a value that inhibits the gas in the vessel from flowing back through the solids transfer device.

2. The system of claim 1, wherein the first pressure is substantially the same as or greater than the second pressure.

3. The system of claim 1, wherein the source of the lignocellulosic biomass slurry comprises one or more pumps adapted to pump the lignocellulosic biomass slurry via one or more pipes in fluid communication with the dewatering system, wherein each pump is configured to pressurize the lignocellulosic biomass slurry above atmospheric pressure.

4. The system of claim 3, further comprising one or more vessels in fluid communication with the one or more pumps, wherein each vessel is adapted to combine lignocellulosic biomass and an aqueous liquid to form the lignocellulosic biomass slurry.

5. The system of claim 4, wherein the one or more vessels are adapted to have its contents exposed to atmospheric conditions.

6. The system of claim 1, wherein at least a portion of the gas present at the first pressure in the first headspace at the inlet of the solids transfer device can be supplied from gas entrained in the source of the lignocellulosic biomass slurry.

7. The system of claim 1, further comprising a source of gas in fluid communication with the dewatering system to provide the gas in the first headspace at the first pressure, wherein the source of the gas comprises one or more gas pipes coupled to the dewatering system.

8. The system of claim 1, wherein the dewatering system further comprises an enclosed screen device that includes a screen having a plurality of openings and the first headspace above the screen; wherein the plurality of openings permit liquid to pass through to separate at least a portion of the water from the lignocellulosic biomass slurry; wherein the screen has a first end and a second end and is positioned so that the first end is above the second end relative to horizontal and so that the screen is at an angle greater than zero relative to horizontal; wherein the enclosed screen device is adapted to receive the lignocellulosic biomass slurry at the first end of the screen so that the slurry flows down and across the screen to separate at least a portion of the water from the lignocellulosic biomass slurry and form a first dewatered lignocellulosic biomass comprising residual water and lignocellulosic biomass that can be fed to the inlet of the solids transfer device; and wherein the solids transfer device is in fluid communication with the enclosed screen device.

9. The system of claim 8, wherein the solids transfer device housing comprises a barrel member having the inlet at one end and the outlet at the opposite end, wherein the inlet is adapted to receive the first dewatered lignocellulosic biomass at the first pressure, wherein the solids transfer device is adapted to convey the first, dewatered lignocellulosic biomass through the barrel member to separate at least a portion of the residual water from the first, dewatered, lignocellulosic biomass and accumulate a second dewatered lignocellulosic biomass proximal to the outlet of the solids transfer device.

10. The system of claim 8, further comprising a source of gas in fluid communication with the enclosed screen device, wherein the enclosed screen device is adapted to receive the gas so that the gas can occupy the first headspace above the screen at the first pressure.

11. The system of claim 8, wherein the enclosed screen device comprises a gravity screen having a screen opening size of about 0.25 inches or less.

12. The system of claim 9, wherein the barrel member comprises:
   a) a screw section proximal to the barrel inlet;
   b) a rotatable screw disposed within the screw section; and
   c) an accumulation section proximal to the barrel outlet.

13. The system of claim 12, further comprising a screen positioned at least in the screw section between the barrel member and the screw, wherein the screen is adapted to permit at least a portion of the residual water to be separated from the first, dewatered lignocellulosic biomass as the screw conveys the first, dewatered lignocellulosic biomass through the barrel member.

14. The system of claim 1, wherein the lignocellulosic biomass comprises ground corn stover.

15. The system of claim 14, wherein the ground corn stover has an average particle size such that at least 80 percent of the ground corn stover passes through a screen having one inch openings.

16. The system of claim 1, wherein the first and second pressure are in the range from 20 to 200 psig; wherein first pressure is the same as or greater than the second pressure.

17. The system of claim 16, wherein the first pressure is greater than the second pressure, and wherein the difference between the first pressure and the second pressure is 5 psi or less.

18. The system of claim 1, wherein the at least one vessel is a pretreatment reactor.

19. The system of claim 18, wherein the pretreatment reactor comprises a hydrolysis reactor operating at conditions to hydrolyze one or more polysaccharides in the lignocellulosic biomass.

20. The system of claim 19, wherein the conditions comprise exposing the lignocellulosic biomass to an aqueous liquid at a temperature in the range from 245° F. to 350° F. and a pH in the range from 0.5 to 3.0 for a time period in the range from 0.5 to 5 hours.

* * * * *